May 31, 1966     R. A. MARTIN     3,253,739
ROTARY FEEDER

Filed April 19, 1964     3 Sheets-Sheet 1

INVENTOR.
ROY A. MARTIN
BY
Newton, Hopkins & Jones
ATTORNEYS

May 31, 1966     R. A. MARTIN     3,253,739
ROTARY FEEDER

Filed April 19, 1964     3 Sheets-Sheet 2

INVENTOR.
ROY A MARTIN
BY
Newton, Hopkins & Jones
ATTORNEYS

May 31, 1966  R. A. MARTIN  3,253,739
ROTARY FEEDER

Filed April 19, 1964  3 Sheets-Sheet 3

INVENTOR.
ROY A. MARTIN
BY
Newton, Hopkins & Jones
ATTORNEYS

United States Patent Office 3,253,739
Patented May 31, 1966

1

3,253,739
ROTARY FEEDER
Roy A. Martin, Atlanta, Ga., assignor to Georgia Tech Research Institute, Atlanta, Ga., a corporation of Georgia
Filed Aug. 19, 1964, Ser. No. 390,608
6 Claims. (Cl. 221—253)

This invention relates to a method of and means for feeding, individually spacing and orientating articles.

Article feeders where the articles are individually delivered from indiscriminate masses by pocketed slides, plates, discs, or belts in an effort to insure a uniform rate of feed and uniform timing of feed or spacing of articles, have long been known. A recurrent problem with such devices has been the difficulty of uniformally delivering one article to each of the pockets and/or failure to maintain the articles in the pocket during their movement to a point of delivery. Further substantial difficulty has been experienced in providing for the automatic orientation of the article as an incident to their discharge from an indiscriminate mass thereof. Conventional article feeders have been limited to attempting consistently uniform rates of feed although in some instances a predetermined irregular pattern of feed may be desirable.

The present invention seeks to improve the operation of individually feeding articles by the use of an apertured selector moving in unison with a pocketed transfer means whereby individual articles from an indiscriminate mass are received in the apertures of the selector for delivery to the pockets of the transfer means while certain apertures and pockets are in registration and moving in unison. The cooperative movement through a portion of their travel of both selector and transfer means provides ample time for the individual delivery of the articles selected to the pockets. Further, since the selector and transfer means are moving uniformally, friction therebetween is nil. As will be noted the movement of the selector is in full contact with the indiscriminate mass of articles hence insuring that each aperture of the selector is supplied with an article for delivery to successive pockets of the transfer means. It will also be noted that in one form of the invention the configuration of the apertures and pockets is such as to permit the selection and transfer of an article only in one predetermined orientation. With the transfer means moving at a uniform speed, the spacing and arrangement of its pockets may provide a predetermined variable delivery pattern of the articles.

While the present invention is broadly applicable to the feeding of a wide variety of articles as in industrial plants and factories the present form of the invention is particularly adapted for seed-feeding in combination with agricultural planting devices. The term "article" is therefore herein used in its broadest sense to include individual seeds, granules or composite pellets as well as larger articles or component parts. In the presently illustrated embodiment of the inventive concept the apertured selector constitutes the bottom plate of a rotary hopper which receives the indiscriminate mass of articles to be individually fed. The pocketed transfer means is an endless belt. A portion of a horizontal flight of the belt passes in registration with the apertures of the selector plate. The conforming spacing of the apertures of the plate and the pockets of the belt together with a synchronous drive therebetween insures the effective, efficient and faithful individual feed of articles from the hopper.

It is therefore among primary objects of the present invention to provide an improved method and means for the delivery of individual articles at faithfully timed and/or spaced intervals.

2

Another object of the invention is to provide method and means for moving an apertured selector and a pocketed transfer means in cooperative unison to provide for accurately uniform article delivery.

A further object of the invention is to provide a method of and means for feeding articles in variable predetermined patterns as to the timing and/or spacing of the articles as they are fed from an indiscriminate mass.

It is also the object of the present invention to provide a feed mechanism by which articles may be oriented as an incident to their individual feed from an indiscriminate mass to individually spaced single articles.

A further object of the invention is to provide an article feeding method and means in which an apertured selector plate and a pocketed transfer belt are moved simultaneously and in unison while their apertures and pockets are in registration during a portion of their travel whereby an article will be delivered from the selector apertures to the belt pockets.

A futher object of the invention is to provide an article feeder so constructed and arranged as to provide simultaneous movement of a selector plate and transfer belt with minimum friction between such plate and belt.

It is a further object of the invention to provide a feeder of the type set forth of simple, effective and efficient construction well designed to meet the demands of economic manufacture and one rugged and durable in the operation.

Numerous other objects, features and advantages of the present invention will be apparent from a consideration of the following specification taken in conjunction with the accompanying drawing in which.

Figure 1:
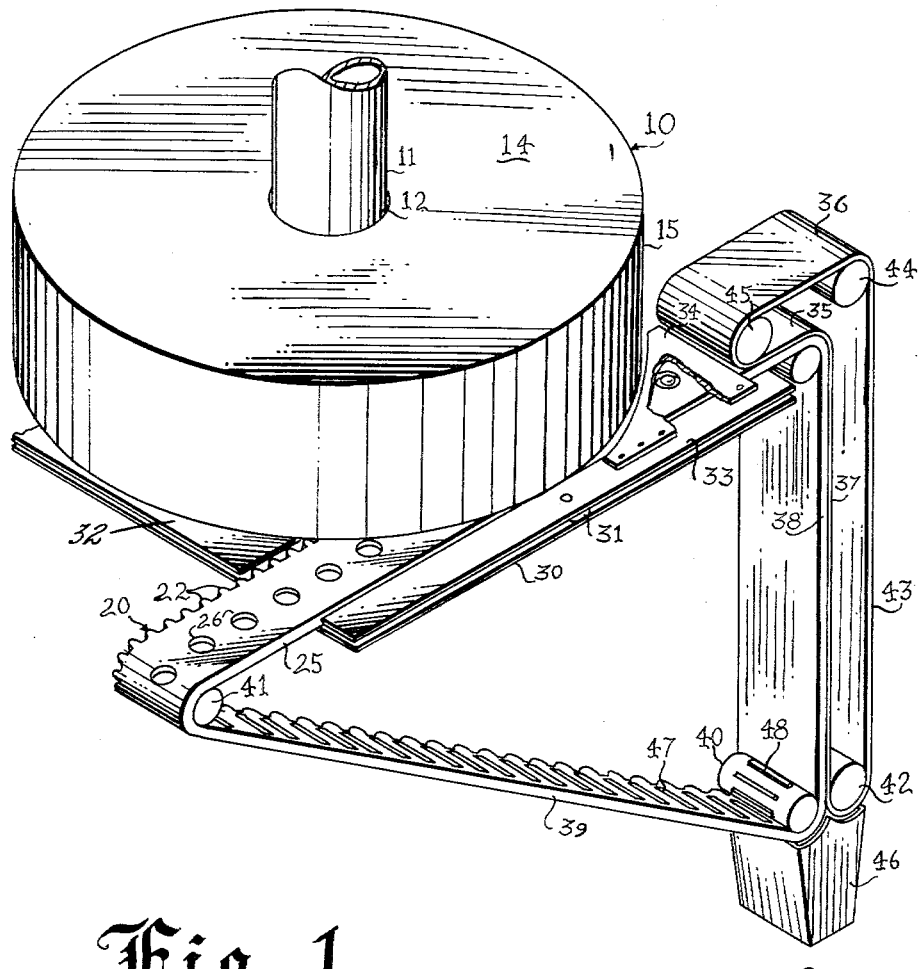
FIG. 1 is a perspective view of one form of the present invention.
Figure 2:
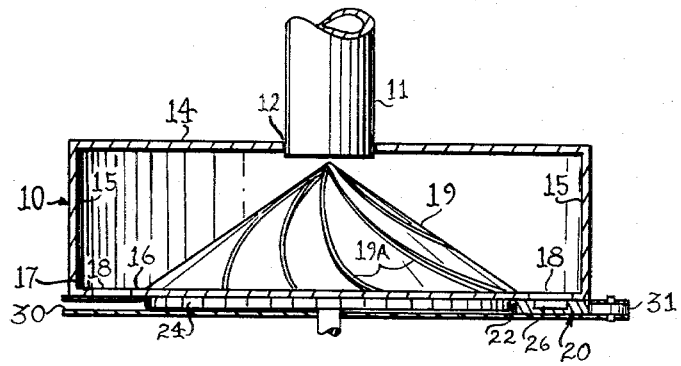
FIG. 2 is a detailed vertical sectional view through the hopper, selector and transfer belt of the present invention.
Figure 3:
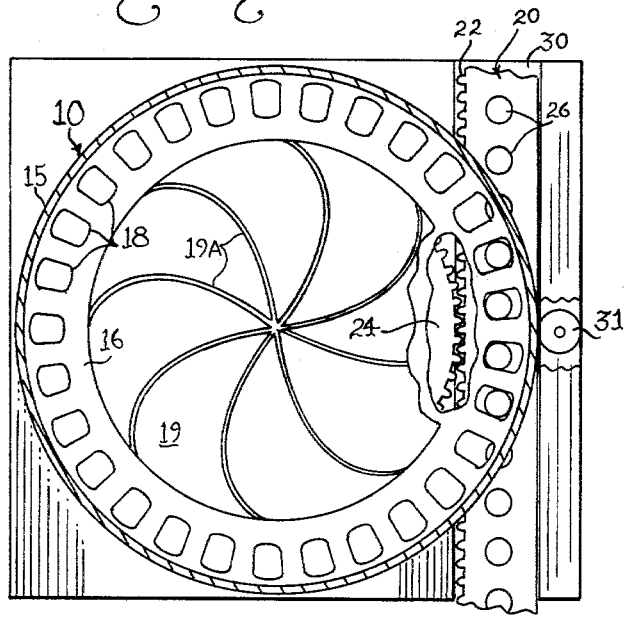
FIG. 3 is a top plan view, partly broken away illustrating the hopper, selector and belt of that form of the invention shown in FIGS. 1 and 2.
Figure 4:
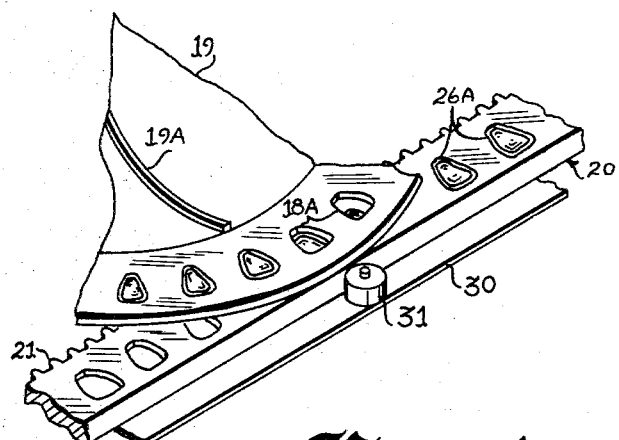
FIG. 4 is a fragmentary detailed view illustrating the manner of orienting articles as an incident to their individual feeding; and, FIG. 5 is a fragmentary section of a transfer belt of the present invention formed to provide a predetermined variable pattern of feed.
Figure 5:
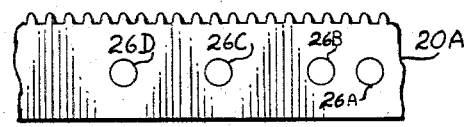

In the presently preferred form of the invention here illustrated there is provided an article hopper 10 of short cylindrical form to which articles may be delivered, in an indiscriminate mass to the center upper area of the hopper by a feed tube 11 loosely inserted through the central feed aperture 12 of the top 14 of hopper. The side walls 15 of the hopper are shown as vertical and are formed integrally with the top 14, the integral bottom 16 is formed with a peripheral edge the portion 17 of which constitutes an apertured selector plate by virtue of its apertures 18. A central conical dome 19 provided with distribution ribs 19A fixed to and rotating with the bottom provides for the distribution of articles from the tube 11 to the peripheral apertured edge 17 of the selector plate bottom 16.

For receiving the selected articles from the selector apertures a pocketed belt 20 is provide. The inner edge of the belt 20, in the direction of the axis of the hopper, is formed with teeth 21 to engage corresponding teeth 22 of a gear 24 fixed to the central outer surface of the bottom 16 of the hopper. Thus, as the belt is moved through its upper horizontal flight indicated at 25, the hopper will be rotated in unison with the belt. It will be noted from the rack and gear type relation between the belt 20 and gear 24 that a drive of either will effect synchronous movement of the other therewith. Since the belt equal to as multiples of, the radial spacing of the apertures of the selector various patterns of discharge may be achieved.

It will be obvious to those skilled in the art that many variations may be made in the embodiments chosen for the purpose of illustrating the present invention without departing from the scope thereof as defined by the appended claims.

I claim:

1. An article feeder comprising a movable selector having spaced apertures in predetermined relationship therein for receiving individual articles from an indiscriminate mass of articles, a transfer belt having a series of pockets therein for receiving the individual articles from the apertures of the selector, means for mounting the transfer belt to pass in contiguous relationship to the apertures of the selector, means carried by the transfer belt for engaging the selector to place the pockets of the transfer belt in registration with the apertures of the selector and to transmit power between the transfer belt and the selector.

2. An article feeder comprising a rotatable selector having spaced apertures in predetermined relationship therein for receiving individual articles from an indiscriminate mass of articles, an endless transfer belt having a series of pockets therein for receiving the individual articles from the apertures of the selector, means for mounting the endless transfer belt for movement in contiguous relationship to the apertures of the selector, means carried by the transfer belt for engaging the selector to place the pockets of the transfer belt in registration with the apertures of the selector and to maintain a constant speed between the transfer belt and the rotatable selector, and power means to impart rotational movement to the selector and linear movement to the transfer belt using the engaging means carried by the transfer belt to transmit the power between the transfer belt and the selector.

3. An article feeder comprising a rotatable hopper having a bottom selector with a series of apertures therein arranged in a predetermined relationship for receiving individual articles from an indiscriminate mass of articles, an endless transfer belt having a series of pockets therein arranged to pass in contiguous relationship to the bottom selector of the hopper for receiving individual articles from the selector apertures, means to guide the transfer belt away from the bottom selector of the hopper to a discharge chute and back to the bottom selector again, an endless retaining belt mounted to engage the transfer belt as it travels from the bottom selector to the discharge chute, said retaining belt engaging that side of the transfer belt having the pockets so as to hold the articles in the pockets until reaching the discharge chute, means carried by the transfer belt for engaging the bottom selector of the rotatable hopper to place the pockets of the transfer belt in registration with the apertures of the bottom selector and to maintain a constant speed between the transfer belt and the rotatable bottom selector, and power means to impart rotational movement to the bottom selector and linear movement to the transfer belt using the engaging means carried by the transfer belt to transmit the power between the transfer belt and the bottom selector.

4. An article feeder comprising a movable selector having spaced apertures in predetermined relationship therein for receiving individual articles from an indiscriminate mass of articles, a toothed gear fixedly secured to the selector, a transfer belt having a series of pockets therein for receiving the individual articles from the apertures of the selector, means for mounting the transfer belt to pass in contiguous relationship to the apertures of the selector, said transfer belt having a series of teeth along one edge for engaging the teeth of the gear secured to the selector whereby the pockets of the transfer belt are maintained in registration with the apertures of the selector and to transmit power between the transfer belt and the selector.

5. An article feeder comprising a rotatable selector having spaced apertures in predetermined relationship therein for receiving individual articles from an indiscriminate mass of articles, a toothed gear fixedly carried by the selector, an endless transfer belt having a series of pockets therein for receiving the individual articles from the apertures of the selector, means for mounting the endless transfer belt for movement in contiguous relationship to the apertures of the selector, said transfer belt having a series of teeth along one edge for engaging the teeth of the gear carried by the rotatable selector whereby the pockets of the transfer belt are maintained in registration with the apertures of the selector and a constant speed is maintained between the transfer belt and the rotatable selector, and power means to impart rotational movement to the selector and linear movement to the transfer belt using the gear carried by the selector and teeth carried by the transfer belt to transmit the power between the transfer belt and the selector.

6. An article feeder comprising a rotatable hopper having a bottom selector with a series of apertures therein arranged in a predetermined relationship for receiving individual articles from an indiscriminate mass of articles, a toothed gear fixedly secured to the bottom selector, an endless transfer belt having a series of pockets therein arranged to pass in contiguous relationship to the bottom selector of the hopper for receiving individual articles from the selector apertures, means to guide the transfer belt away from the bottom selector of the hopper to a discharge chute and back to the bottom selector again, an endless retaining belt mounted to engage the transfer belt as it travels from the bottom selector to the discharge chute, said retaining belt engaging that side of the transfer belt having the pockets so as to hold the articles in the pockets until reaching the discharge chute, said transfer belt having a series of teeth along one edge for engaging the teeth of the gear secured to the selector whereby the pockets of the transfer belt are maintained in registration with the apertures of the selector and a constant speed is maintained between the transfer belt and the rotatable selector, and power means to impart rotational movement to the bottom selector and linear movement to the transfer belt using the gear secured to the rotatable selector and the teeth carried by the transfer belt to transmit power between the transfer belt and the selector.

References Cited by the Examiner

UNITED STATES PATENTS

| 1,912,248 | 5/1933 | Bateman et al. | 221—237 |
| 2,667,961 | 2/1954 | Reese et al. | 221—236 |
| 2,684,781 | 7/1954 | Allen et al. | 221—253 |
| 2,908,420 | 10/1959 | Hoffmann et al. | 221—225 |
| 2,930,509 | 3/1960 | Hall | 221—182 |
| 2,949,997 | 8/1960 | Martell | 221—225 |

FOREIGN PATENTS 574,524   4/1957   Italy.

LOUIS J. DEMBO, *Primary Examiner.*

WALTER SOBIN, *Examiner.*